(No Model.) 2-Sheets—Sheet 1.
R. G. WARD.
AUTOMATIC SUPPLY TANK FOR LOCOMOTIVES.
No. 502,152. Patented July 25, 1893.
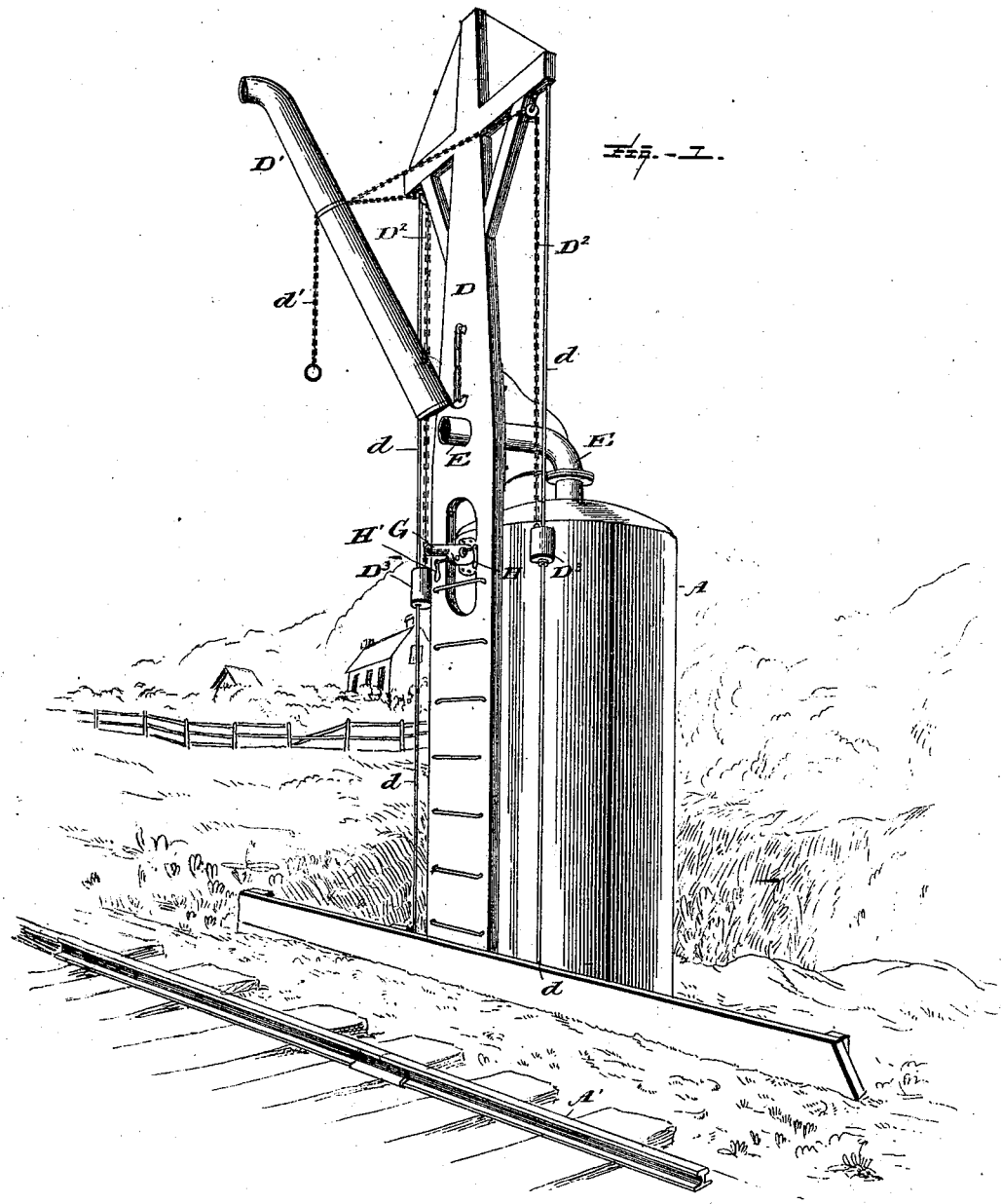
Witnesses
L. C. Hills
E. H. Bond
Inventor:
Randolph G. Ward.
By E. B. Stocking
Attorney

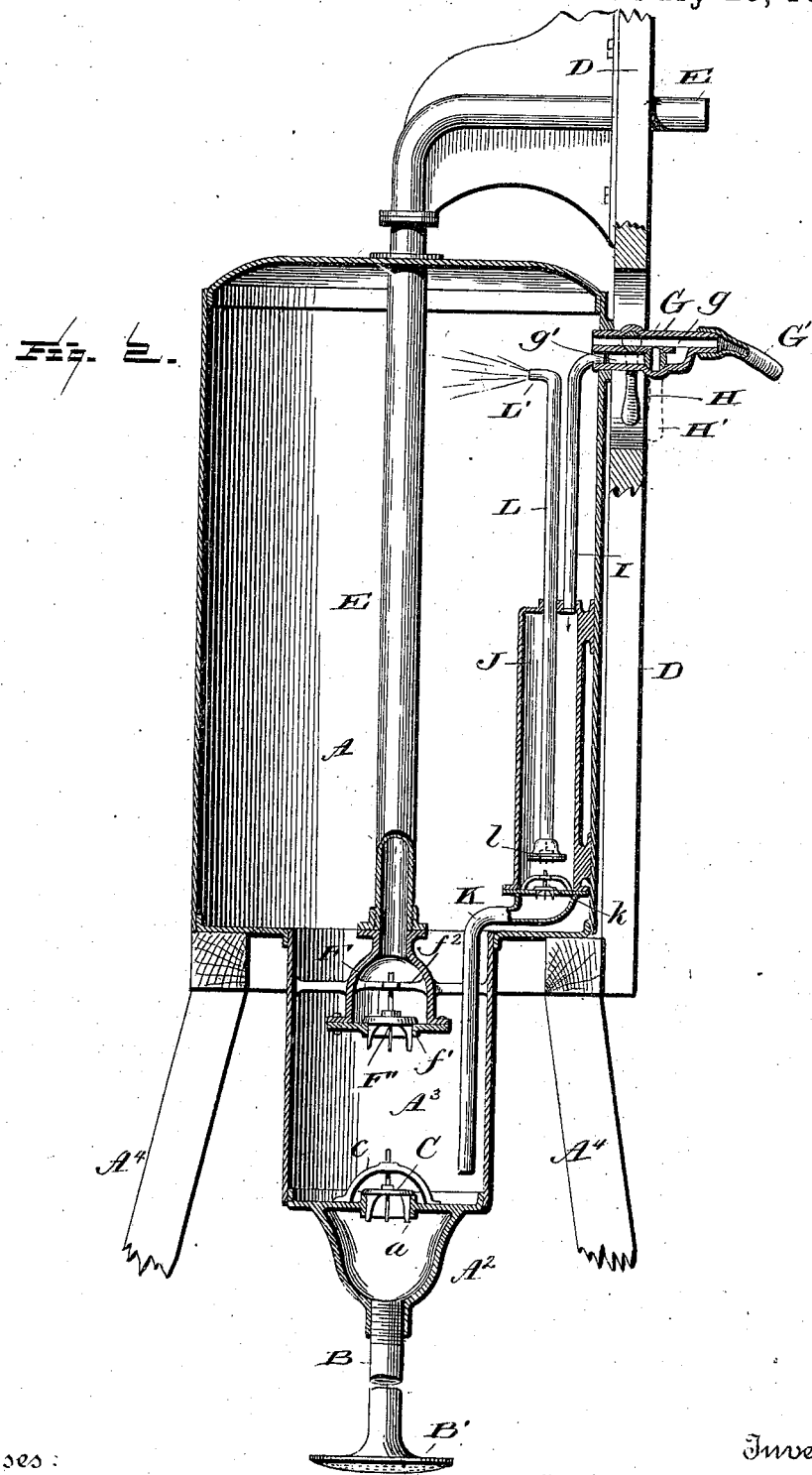

UNITED STATES PATENT OFFICE.

RANDOLPH G. WARD, OF CHARLESTON, SOUTH CAROLINA.

AUTOMATIC SUPPLY-TANK FOR LOCOMOTIVES.

SPECIFICATION forming part of Letters Patent No. 502,152, dated July 25, 1893.

Application filed December 6, 1892. Serial No. 454,291. (No model.)

*To all whom it may concern:*

Be it known that I, RANDOLPH G. WARD, a citizen of the United States, residing at Charleston, in the county of Charleston, State of South Carolina, have invented certain new and useful Improvements in Automatic Tanks for Locomotives, of which the following is a specification, reference being had therein to the accompanying drawings.

The present invention relates to certain new and useful improvements in supply tanks for locomotives and it has for its object among others to provide a tank for this purpose which shall be simple in its construction and mode of operation and in which the valves shall be located entirely within the tank or receptacle whereby they are protected and prevented from freezing and where also they are not subject to the rough handling that this class of devices are liable to receive in transporting and setting them up in position for use and in any ordinary use of the same. The main portion of the operative parts is located within the main body of the apparatus so that when the exterior appurtenances are detached therefrom it can easily be moved from place to place without injury to said parts and especially so when the main body portion is of cylindrical form. While designed especially for permanent railroad service, being equipped with discharge fixtures of any ordinary or approved type, it may without material change be made portable or for suspension from any suitable overhead support over a supply of water. For operating the pump I utilize the steam from the locomotive the introduction of which will quickly melt any ice that may have formed in or about the pipes or valves. Each locomotive served supplies the motive power for forcing the water from the apparatus into the tender and for condensing the charge of steam which it provides to the apparatus thereby forming a vacuum therein by which the apparatus is again filled so as to be in a condition to serve a succeeding locomotive.

My improvement dispenses with the employment of extraneous means as pumping mechanism and thereby very materially reduces the original cost of the apparatus as well as of maintaining the same.

Other objects and advantages of the invention will appear in the following description and the novel features thereof will be particularly pointed out in the claims.

The invention is clearly illustrated in the accompanying drawings, which, with the letters of reference marked thereon, form a part of this specification, and in which—

Figure 1 is a perspective view of my improvement set up ready for use. Fig. 2 is an enlarged vertical section through the same with parts in side elevation and portions broken away.

Like letters of reference refer to like parts in both figures of the drawings.

Referring now to the details of the drawings by letter A designates a tank of any suitable shape, material and dimensions and this may be supported in any suitable manner, either temporarily or permanently and if more convenient it may be suspended over a suitable source of water supply, as for instance from a bridge; I have shown it as supported upon the ground in proximity to the track $A'$. The water which supplies the tank may be taken from a well or dam or any other suitable source into which is designed to extend the inlet pipe B which is preferably provided with a rose $B'$ or other equivalent device and which pipe is supported by the portion $A^2$ which depends from the chamber $A^3$ below the bottom of the tank proper as seen in Fig. 2. The top of this chamber or portion $A^2$ is formed with a valve seat upon which is seated the valve C of any suitable construction, the stem of which may be guided through a guide $c$ as seen in Fig. 2. The supports $A^4$ of the tank are such as to allow the depending portion $A^2$, $A^3$ to extend the proper distance within the well or body of water from which the tank is filled.

D represents an upright of any suitable construction which may be made to serve the purpose of a ladder to permit ready access to the top of the tank or the valve on the pipe which is designed for connection with the pipe leading from the steam space of the locomotive. Upon this upright is pivotally supported the pipe $D'$ carried by the chains $D^2$ provided with counterweights $D^3$ sliding upon the rod $d$ and designed to normally be held in its substantially vertical position as indicated in Fig. 1 but to be pulled down as by chain $d'$ and fit over the outer pipe from the tank when it is designed to take water therefrom into the tank of the tender. The manner of supporting this pipe, however, is immaterial and forms no part of the present invention.

E is the discharge pipe from the tank, preferably arranged centrally therein as shown and the horizontal portion extended above the top of the tank and may be supported by extending it through an opening in the upright D as shown. This pipe extends preferably to the bottom of the tank and has connected therewith the bell shaped casting F which is supported in any suitable manner as by a spider $f$ within the chamber $A^3$ and in the bottom of this bell shaped casting is a valve seat $f'$ upon which the valve $F'$ is designed to seat itself, said valve being guided in its movement by having its stem passed through the spider $f^2$ all as clearly shown in Fig. 2.

Near the upper end of the tank A is a connection or pipe G for admitting steam into the interior of the tank; it projects sufficiently beyond the tank and through an opening in the upright D to receive the end of a connection as a flexible pipe $G'$ designed to convey steam from the locomotive into the tank. This pipe is provided with two passages, one $g$ leading into the tank proper and controlled by a stop cock H and the other $g'$ controlled by a cock $H'$ as seen in Fig. 2. This latter passage $g'$ connects by pipe I which discharges into the smaller tank J supported within the tank A and provided at its bottom with a suction pipe K extending into the chamber $A^3$ of the tank A and provided with a valve $k$ as seen in Fig. 2.

L is a discharge pipe on the tank J, being provided at its lower end with a valve L and its upper end extended to nearly the top of the tank A and terminating in a nozzle $L'$. It will thus be seen that the valves and pipe are all located within the tank and thereby protected from freezing and from the rough handling which they might otherwise receive in transportation or usage. Should the water in the upper end of the pipe freeze the steam let into the tank will quickly melt it so that it will thaw and flow out before the pressure is applied.

With the parts constructed as above described the operation is as follows: Taking the apparatus when it is full of water the engine wanting water is connected with the pump by means of the pipe $G'$ as seen in Fig. 2 and which is designed to connect with the steam space or elsewhere on the locomotive and the cock H is open the cock $H'$ being closed when pressure of steam will force out the water through the discharge pipe E and into the tank of the tender with which suitable connection has been made by lowering the pipe $B'$. When as much water as is desired has been drawn from the tank the cock H is closed and the cock $H'$ opened thereby letting steam through the pipe I into the tank J and blowing the water therefrom into the tank A through the pipe L and nozzle $L'$ in the form of a spray which causes the steam in the tank to rapidly condense and forming a vacuum whereby the water is drawn up into the tank and as the water surrounds the smaller tank J it condenses the steam therein and causes a vacuum and thus the tank is recharged for the next operation. When the steam has been admitted and the water forced from the tank J the engine is disconnected and the cock $H'$ closed. The same operation is repeated each time an engine takes water.

The apparatus is first filled with water by an operation exactly as described so far as the application of steam under pressure is concerned whereby the first effect is to drive all the air out of the apparatus by way of the main discharge pipe E. This produces a vacuum and the water is thereby drawn up into the apparatus for the purpose of filling the same and the inner tank J therein.

Various modifications in detail may be resorted to without departing from the spirit of the invention or sacrificing any of its advantages.

When it is desired to transport the device the upright D with its attachments is removed, the horizontal portion of the discharge pipe E is detached and pipe G which is detachably mounted, is removed when the tank can be easily transported and rolled if desired without danger or injury thereto.

The object of the depending secondary tank is manifestly to give to the valve $F'$ of the pipe F a source of water which will maintain it sealed when the main volume of water has been forced out; as also to insure the action of the suction pipe K of the condensing chamber J so long as there may be any water remaining in the tank as it is easily seen that the lower ends of the pipes F and K should, if possible, be continually immersed to maintain the efficiency of the valves thereto attached.

What I claim is—

1. The combination with the tank and its inclosed discharge pipe with valve, of the condensing chamber within the tank and having independent discharge pipe and valve, of the steam inlet pipe having independent passages one of which communicates with the condensing chamber, the independently-operated valves for said passages, and the valve in the discharge pipe of the condensing chamber, the depending chamber within which the inner end of the discharge pipe is located and the valve and suction pipe at the bottom of the depending chamber, substantially as specified.

2. The combination with the tank and its inclosed discharge pipe, with valve of the condensing chamber within the tank and having independent discharge pipe and valve, of the steam inlet pipe having independent passages one of which communicates with the condensing chamber, the independently-operated valves for said passages and the valve in the discharge pipe of the condensing chamber, the depending chamber within which the inner end of the discharge pipe is located, the valve and suction pipe at the bottom of the depending chamber and the suction pipe from the condensing chamber extended into said depending chamber below the valve of the discharge pipe, substantially as specified.

3. The combination with the tank having a depending chamber, of the condensing chamber within the tank, the centrally-arranged discharge pipe within the tank with its lower end extended into said chamber and provided with a valve, the condensing chamber within the tank, a suction pipe with valve depending from the condensing chamber into the depending chamber, independent discharge pipe from the condensing tank extending nearly to the top of the main tank, the steam inlet pipe having independent passages one of which is connected with the condensing chamber and the independently-operated valves to said passages having independent operating means, substantially as specified.

4. The combination with a tank having a secondary depending chamber thereto and a valve located at the lower end thereof connecting with a suitable suction pipe, a discharge pipe centrally located having an uplifting valve and chamber depending from its lower end also centrally located, a condensing chamber located within said tank having uplifting valve and suction pipe located at its lower extremity which suction pipe projects downwardly and into the secondary chamber, and a discharge pipe located within and projecting above said condensing chamber provided with a valve and chamber at its lower extremity, a connection provided with two orifices and valves one of which connects with the tank and the other of which connects with the condensing chamber and both of which are operated and actuated separately and independently, as described and for the purposes set forth.

5. The combination with the upright having an opening therein, of the tank, its supplemental tank, discharge pipe, depending chamber, suction pipe and valves, the suction pipe, discharge pipe and valves to the supplemental tank, the steam inlet pipe having two independent passages and removably affixed to the tank in said opening in the upright and the independently operated valves for said passages with their handles located within or at the opening in the upright, substantially as and for the purpose specified.

In testimony whereof I affix my signature in presence of two witnesses.

RANDOLPH G. WARD.

Witnesses:
   HEATH SUTHERLAND,
   L. C. HILLS.